(12) United States Patent
Tondu

(10) Patent No.: US 11,865,811 B2
(45) Date of Patent: Jan. 9, 2024

(54) LAMINATED GLAZING COMPRISING A TRANSPARENT SUBSTRATE WITH A HEATING LAYER HAVING ABLATION LINES EACH CLOSING ON ITSELF

(71) Applicant: SAINT-GOBAIN GLASS FRANCE, Courbevoie (FR)

(72) Inventor: Thomas Tondu, Sully (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 953 days.

(21) Appl. No.: 16/647,298

(22) PCT Filed: Sep. 13, 2018

(86) PCT No.: PCT/FR2018/052249
§ 371 (c)(1),
(2) Date: Mar. 13, 2020

(87) PCT Pub. No.: WO2019/053381
PCT Pub. Date: Mar. 21, 2019

(65) Prior Publication Data
US 2020/0215797 A1   Jul. 9, 2020

(30) Foreign Application Priority Data

Sep. 15, 2017 (FR) .................................... 1758569

(51) Int. Cl.
*B32B 17/10* (2006.01)
*H05B 3/86* (2006.01)

(52) U.S. Cl.
CPC .... *B32B 17/10036* (2013.01); *B32B 17/1055* (2013.01); *B32B 17/10192* (2013.01);
(Continued)

(58) Field of Classification Search
CPC ........ B32B 17/10036; B32B 17/10192; B32B 17/1055; B32B 17/10174;
(Continued)

(56) References Cited

U.S. PATENT DOCUMENTS

| 2,878,357 A | 3/1959 | Thomson et al. |
| 2005/0178756 A1* | 8/2005 | Degand ................. H05B 3/84 219/203 |

(Continued)

FOREIGN PATENT DOCUMENTS

| DE | 102004029164 A1 * | 12/2005 | ............. B32B 17/10 |
| EP | 1 897 412 B1 | 12/2013 | |

(Continued)

OTHER PUBLICATIONS

International Search Report as issued in International Patent Application No. PCT/FR2018/052249, dated Jan. 2, 2019.

(Continued)

*Primary Examiner* — Shawntina T Fuqua
(74) *Attorney, Agent, or Firm* — Pillsbury Winthrop Shaw Pittman LLP

(57) ABSTRACT

A laminated glazing has a plurality of rigid transparent substrates that are bonded to one another pairwise via an intercalary adhesive layer, at least one of these transparent substrates being coated with an electrically conductive layer that is substantially uniform in nature and thickness, a zone of which has four edges opposing one another in pairs, first and second busbars being arranged along two opposite edges, ablation lines of the electrically conductive layer closing in on themselves while forming non-conductive strips, each occupying a major portion of the distance between the busbars, the shape of the non-conductive strips (Continued)

being capable of providing a temperature of heating by the electrically conductive layer that is virtually constant over the entire area of the zone.

17 Claims, 1 Drawing Sheet

(52) U.S. Cl.
CPC ..... *B32B 17/1077* (2013.01); *B32B 17/10174* (2013.01); *B32B 17/10293* (2013.01); *B32B 17/10541* (2013.01); *B32B 17/10788* (2013.01); *H05B 3/86* (2013.01); *H05B 2203/007* (2013.01); *H05B 2203/011* (2013.01); *H05B 2203/013* (2013.01)

(58) Field of Classification Search
CPC .......... B32B 17/10293; B32B 17/1054; B32B 17/1077; B32B 17/10788; B32B 17/10211; B32B 17/1022; B32B 17/10761; B32B 7/12; B32B 27/08; H05B 3/86; H05B 3/141; H05B 2203/007; H05B 2203/011; H05B 2203/013

See application file for complete search history.

(56) References Cited

U.S. PATENT DOCUMENTS

| | | | |
|---|---|---|---|
| 2013/0186875 A1 | 7/2013 | Lisinski | |
| 2018/0299116 A1* | 10/2018 | Kramer | ................ B32B 29/005 |

FOREIGN PATENT DOCUMENTS

| | | | | |
|---|---|---|---|---|
| EP | 3487720 B1 * | 5/2021 | ....... | B32B 17/10036 |
| KR | 10-2008-0028890 A | 4/2008 | | |
| WO | WO-2007045786 A1 * | 4/2007 | ............. | B32B 17/10 |
| WO | WO-2016000927 A1 * | 1/2016 | ....... | B32B 17/10036 |

OTHER PUBLICATIONS

Notice of Preliminary Rejection as issued in Korean Patent Application No. 10-2020-7008936, dated Dec. 15, 2022.

* cited by examiner

LAMINATED GLAZING COMPRISING A TRANSPARENT SUBSTRATE WITH A HEATING LAYER HAVING ABLATION LINES EACH CLOSING ON ITSELF

CROSS-REFERENCE TO RELATED APPLICATIONS

This application is the U.S. National Stage of PCT/FR2018/052249, filed Sep. 13, 2018, which in turn claims priority to French patent application number 1758569 filed Sep. 15, 2017. The content of these applications are incorporated herein by reference in their entireties.

Glazing for transport vehicles (aircraft, trains, helicopters, boats, cars, etc.) and, in some cases, glazing for buildings may be provided with heating functions incorporated within the glazing for preventing/removing, as the case may be, condensation on the interior face or frost on the exterior face.

The heating is characterized by its specific power (W/m$^2$), which is suited to the specific needs of each application.

The heating system consists either of wires embedded in the glazing or of transparent conductive layers (doped oxides: tin-doped indium oxide, or indium tin oxide: ITO; AZO (aluminum zinc oxide); SnO$_2$:F; or metals such as silver or gold) allowing heating by Joule effect. In both cases, the heating system is supplied with power via electrodes at a voltage that is available in the vehicle or building. In the simple case of a rectangular glazing with a heating layer having a surface resistivity Rs, heated at the voltage U by two electrodes on two opposite sides separated by a distance D, the resulting specific power Ps is determined by the following equation:

$$Ps = \frac{U^2}{Rs \cdot D^2}$$

Glasses with a heating layer are obtained either by cutting, and potentially shaping, a glass in which a layer is already present or by depositing the layer on a shaped glass later on (after cutting). The term "glass" is understood here preferably to mean any mineral glass, but a rigid transparent substrate made of polymer material, a typical example of which is poly(methyl methacrylate) (PMMA), is also possible.

Since it is not possible to uniformly heat a non-rectangular shape using a uniform electrically conductive layer, two strategies are implemented:
  an electrical conductivity gradient, typically obtained by means of a gradient in the thickness of conductive metal oxide (typically ITO);
  ablation lines in an electrically conductive layer, called flow lines, such as described in the patent EP1897412-B1, which orient the direction in which the electric current flows and also often require a gradient in the thickness of the layer.

The use of glass with a pre-deposited conductive layer (deposited before cutting, and potentially before shaping/bending) is industrially and economically much more advantageous because it benefits from the scaling effects of production that is not specific to one glazing.

However, this is not possible in two quite common cases:
  the electrical conductivities of glass with a layer are not compatible with the dimensions of the glazing and the available supply voltage with regard to achieving the desired specific power (in other words, for a given geometry and available voltage, a target specific power requires the layer to have a resistance value that is not available or not standard in motor vehicles or buildings);
  the shape of the glazing deviates substantially from a rectangle: overheated and underheated areas occur.

In glazing with a high specific power (the threshold being of the order of kW/m$^2$), local overheating effects may lead to the glazing aging badly, or even to deterioration of the optical properties (through local creep of the intercalary adhesive in the laminated glazing) or local bubbling of this intercalary adhesive.

It is possible to overcome these two limitations by depositing the electrically conductive layer in a controlled manner so as:
  to adjust the conductivity (by controlling the deposition process: thickness gradient, O$_2$ content of the metal oxide, ITO or other, etc.);
  to counter the effects due to shape by creating an electrical conductivity map for this purpose.

Lastly, It is also possible to aid in the homogenization of the specific power by channeling the electric current in particular by ablating conductive layer lines using laser-based processes.

The object of the invention is therefore to use glasses with a uniform conductive layer (designed for solar control, low-e performance, motor vehicle heating, etc.) to obtain a desired specific power of heating that is uniform over the entire heating area, regardless of how complex its geometry is.

This object is achieved by the invention, the subject of which is therefore a laminated glazing consisting of a plurality of rigid transparent substrates that are bonded to one another pairwise via an intercalary adhesive layer, at least one of these transparent substrates being coated with an electrically conductive layer that is substantially uniform in nature and thickness, a zone of which has four edges opposing one another in pairs, first and second busbars being arranged along two opposite edges, characterized in that ablation lines of the electrically conductive layer close in on themselves while forming non-conductive strips, each occupying a major portion of the distance between the busbars, the shape of the non-conductive strips being capable of providing a temperature of heating by the electrically conductive layer that is virtually constant over the entire area of the zone.

The non-conductive strips relate of course to the flow of electric current.

The area that is complementary to that of the non-conductive strips defines the conductive strips (or zones), which constitute types of electrically conductive layer wires, the width and spacing of which are suitable for obtaining the desired specific power at the available supply voltage.

The selective ablation of layers allows adaption to the available supply voltage and allows the effects due to shape to be managed. Only a fraction of the area of the layer participates in the circulation of the current, thereby increasing the apparent resistivity. Additionally, this increase in apparent resistivity is accompanied by a channeling of the current, which allows complex shapes to be managed. The apparent conductivity is therefore decreased by allowing the electric current to flow through only a fraction of the layer.

Ablations or ablation lines may generally be designed for any shape.

The width of the non-conductive zones must be small enough (of the order of millimeters, depending on the specific power) not to result in optical haze on heating (the effect of a change in the refractive index of the intercalary adhesive in the laminated glazing with temperature). It is this same issue that governs the permissible spacing for wire-based heated glazing.

According to preferred features of the laminated glazing according to the invention:

the distance between the first and second busbars varies along the opposite edges, and the width of the conductive strips increases with the distance between the busbars; for example, for a heating zone of constant width and hence of variable distance between power supply electrodes (busbars), heating may be achieved by forming conductive bands whose width is uniform over their length but adjusted for the length between electrodes;

the first busbar is longer than the second busbar, and the width of each conductive strip increases from the first busbar to the second; thus, for example, for electrodes (busbars) that are of different lengths but run parallel, the conductive strip must form a quadrilateral that is narrower on the side of the longest electrode to obtain a uniform specific power;

the electrically conductive layer is based on doped metal oxide such as tin-doped indium oxide (ITO) or $SnO_2$:F, or on a silver multilayer stack; this last application is preferred because the ablations are less visible;

the surface conductivity or sheet resistance of the conductive layer is between 0.5 and 100Ω/□; this value is chosen according to the dimensions of the glazing to be heated and the available supply voltage;

the width of the ablation lines ranges from 5 to 200 μm, bearing in mind that narrow ablations are less visible but technically more difficult to produce;

the width of the conductive strips is at least equal to 50, preferably 200 μm, and at most equal to 5, preferably 3 mm;

the pitch of the pattern of the conductive strips and of the non-conductive strips is at least equal to 0.5, preferably 1 mm, and at most equal to 10, preferably 4 mm; the pitch of the pattern is the width of one conductive strip and one non-conductive strip that are adjacent to one another; this pitch is smaller for higher specific powers (up to 7 kW/m$^2$) and larger for lower specific powers (down to 350 W/m$^2$);

it is made of glass such as soda-lime, aluminosilicate or borosilicate glass, or made of polymer material such as poly(methyl methacrylate) (PMMA), polycarbonate (PC) or polyurethane (PU);

the electrically conductive layer is on the face that is oriented toward the interior of the laminated glazing of at least one of the two rigid transparent substrates constituting the two exterior surfaces of the laminated glazing;

the intercalary adhesive layer is chosen from polyvinyl butyral (PVB), polyurethane (PU) and ethylene/vinyl acetate (EVA), alone or in a blend of a number thereof.

The invention also relates to:

the application of the laminated glazing as defined above, wherein the transparent substrate according to the invention is intended to make contact with the outside atmosphere, as a defrosting/anti-frost glazing;

the application of the laminated glazing as defined above, wherein the transparent substrate according to the invention is intended to make contact with the interior space of a vehicle or of a building, as a defogging/anti-fog glazing.

These applications are targeted in particular at an air, ground or water vehicle, in particular at an aircraft, and preferably as the front or side glazing of an aircraft cockpit.

The invention will be better understood in the light of the following description of the appended FIGS. 1 and 2, which are schematic representations of two main embodiments of a transparent substrate that is characteristic of the laminated glazing of the invention.

BRIEF DESCRIPTION OF THE DRAWINGS

With reference to FIGS. 1 and 2, a transparent substrate made of aluminosilicate glass is coated with an electrically conductive layer (2) made of tin-doped indium oxide (ITO) that is substantially uniform in thickness, a zone (1) of which has four edges opposing one another in pairs (3, 5), (4, 6), first and second busbars (7, 8) being arranged along two opposite edges (3, 5).

Figure 1:
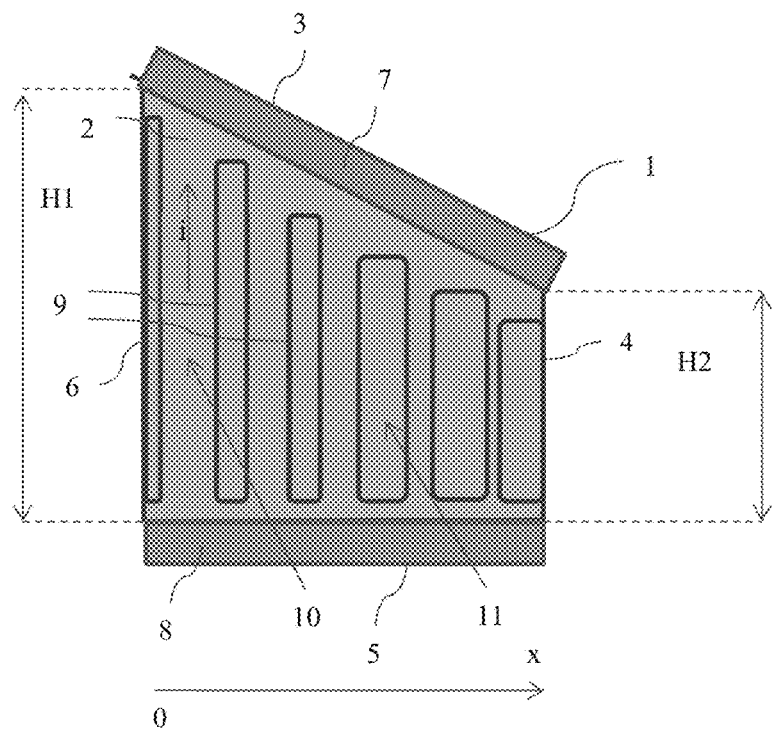
FIG. 1 is a schematic representation of a substrate coated with an electrically conductive layer and that includes busbars and ablation lines according to an embodiment of the invention.

Ablation lines (9) of the electrically conductive layer (2) close in on themselves while forming non-conductive strips (11), each occupying a major portion of the distance between the busbars (7, 8). The area that is complementary to the non-conductive strips (11) in the zone (1) defines conductive strips (10).

Exemplary Embodiment Shown in FIG. 1

Specific power: Ps=7000 W/m$^2$
Surface resistivity: R squared=0.9 Ω/□
Supply voltage: U=40 V
Width: L=0.4 m
Maximum height H1=0.4 m
Minimum height H2=0.2 m An abscissa x that goes from 0 at the maximum height H1 to 0.4 m at the minimum height H2 is defined. The height H at an abscissa x is $H(x)=H1+x/L\cdot(H2-H1)$ The width or pitch of the pattern is defined as the width of one conductive strip (10) and one non-conductive strip (11) that are adjacent to one another; the value of it here is e0=600 μm, i.e. 667 patterns.

The width of the conductive strip (10) depends on the position:

$$e = e0 \frac{Rsquared \cdot Ps \cdot H^2(x)}{U^2}$$

Figure 2:
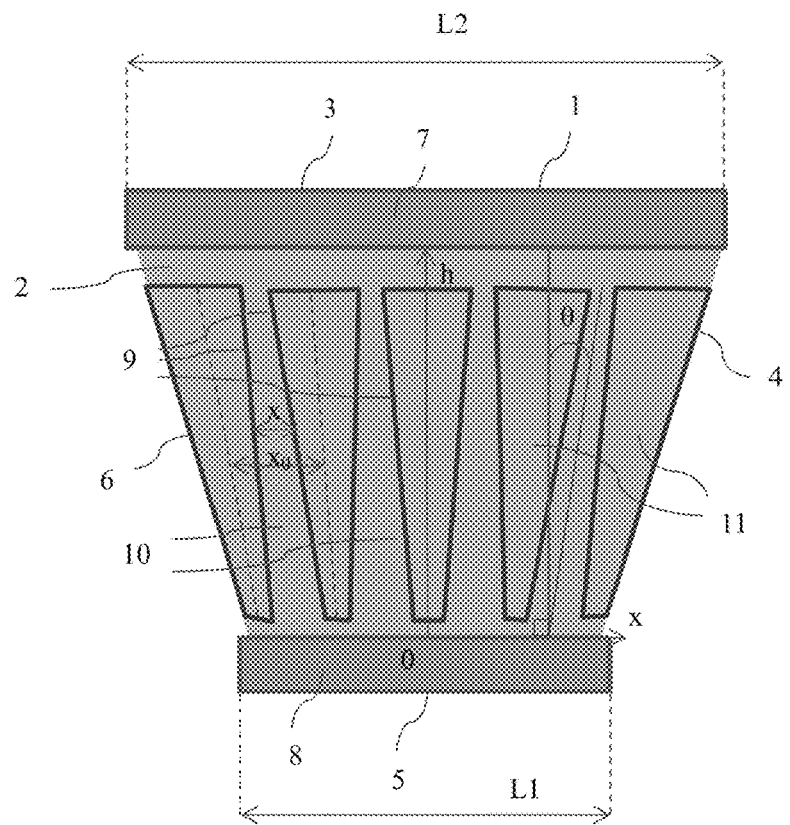
FIG. 2 is a schematic representation of a substrate coated with an electrically conductive layer and that includes busbars and ablation lines according to an embodiment of the invention.

This gives the following numerical application:
The conductive width on the side of the shortest distance between busbars (H2) is e1=95 μm
The conductive width on the side of the longest distance between busbars (H1) is e2=378 μm Exemplary Embodiment Shown in FIG. 2 busbar with L1=1 m and L2=1.5 m
distance between busbars H=1 m specific power Ps=1000 W/m² at U=100 V
layer with R squared=5 Ω/☐
n=31 conductive strips:

The width of the pattern as defined above is dependent on the position h between the two busbars x0(h)=(L1+h/H(L2−L1))/n The center of each conductive strip defines a straight line segment that forms an angle θ relative to the normal to the busbars.

The value of the width of the conductive strip is:

$$x = \frac{Rsquared}{x_0 \cos^2\theta}\left(\frac{(L1+L2)H}{2U}\right)^2 \frac{Ps}{n^2}$$

In this specific case, the width of the central conductive strip is 2.52 mm on the side of the short busbar (8) and 1.68 mm on the side of the long busbar (7).

The invention is thus particularly advantageous for vehicle heated glazing for which the electrical power supply is set, since it allows a desired specific power of heating to be established uniformly over the entire heating surface.

The invention claimed is:

1. A laminated glazing comprising:
   a plurality of rigid transparent substrates that are bonded to one another pairwise via an intercalary adhesive layer, at least one of the plurality of rigid transparent substrates being coated with an electrically conductive layer that is substantially uniform in nature and thickness, a zone of said least one rigid transparent substrate having four edges opposing one another in pairs, and
   first and second busbars arranged along two opposite edges of said least one rigid transparent substrate,
   wherein the electrically conductive layer comprises ablation lines,
   wherein the ablation lines of the electrically conductive layer close in on themselves while forming non-conductive strips, each of the non-conductive strips occupying a major portion of a distance between the first and second busbars, a shape of the non-conductive strips being capable of providing a temperature of heating by the electrically conductive layer that is virtually constant over the entire area of the zone,
   wherein the width of the conductive strips is at least equal to 50 μm, and at most equal to 5 mm, and
   wherein a pitch of the pattern of the conductive strips and of the non-conductive strips is at least equal to 0.5 mm, and at most equal to 10 mm.

2. The laminated glazing as claimed in claim 1, wherein the distance between the first and second busbars varies along the opposite edges, and wherein a width of the conductive strips increases with the distance between the first and second busbars.

3. The laminated glazing as claimed in claim 1, wherein the first busbar is longer than the second busbar, and wherein the width of each conductive strip increases from the first busbar to the second busbar.

4. The laminated glazing as claimed in claim 1, wherein the electrically conductive layer is based on doped metal oxide, or on a silver multilayer stack.

5. The laminated glazing as claimed in claim 1, wherein the surface conductivity or sheet resistance of the conductive layer is between 0.5 and 100 Ω/☐.

6. The laminated glazing as claimed in claim 1, wherein the width of the ablation lines ranges from 5 to 200 μm.

7. The laminated glazing as claimed in claim 1, wherein the transparent substrate that is coated with the electrically conductive layer is made of glass, or made of polymer material.

8. The laminated glazing as claimed in claim 1, wherein the electrically conductive layer is on the face that is oriented toward the interior of the laminated glazing of at least one of the two rigid transparent substrates constituting the two exterior surfaces of the laminated glazing.

9. The laminated glazing as claimed in claim 1, wherein the intercalary adhesive layer is chosen from polyvinyl butyral, polyurethane and ethylene/vinyl acetate, alone or in a blend of a number thereof.

10. A method comprising utilizing a laminated glazing as claimed in claim 1 as a defrosting/anti-frost glazing, wherein the transparent substrate coated with the electrically conductive layer makes contact with the outside atmosphere.

11. A method comprising utilizing a laminated glazing as claimed in claim 1 as a defogging/anti-fog glazing, wherein the transparent substrate coated with the electrically conductive layer makes contact with the interior space of a vehicle or of a building.

12. The laminated glazing as claimed in claim 4, wherein the electrically conductive layer is a layer of tin-doped indium oxide (ITO) or $SnO_2$:F.

13. The laminated glazing as claimed in claim 1, wherein the width of the conductive strips is at least equal to 200 μm, and at most equal to 3 mm.

14. The laminated glazing as claimed in claim 1, wherein a pitch of the pattern of the conductive strips and of the non-conductive strips is at least equal to 1 mm, and at most equal to 4 mm.

15. The laminated glazing as claimed in claim 7, wherein the glass is a soda-lime, aluminosilicate or borosilicate glass, and the polymer material is a poly(methyl methacrylate) (PMMA), polycarbonate (PC) or polyurethane (PU).

16. The laminated glazing as claimed in claim 1, wherein none of the one or more ablation lines that form at least one of the non-conductive strips extend to the first or the second busbar such that said at least one of the non-conductive strips is surrounded on all sides by a conductive region of the electrically conductive layer.

17. A laminated glazing comprising:
   a plurality of rigid transparent substrates that are bonded to one another pairwise via an intercalary adhesive layer, at least one of the plurality of rigid transparent substrates being coated with an electrically conductive layer that is substantially uniform in nature and thickness, a zone of said least one rigid transparent substrate having four edges opposing one another in pairs, and
   first and second busbars arranged along two opposite edges of said least one rigid transparent substrate,
   wherein the electrically conductive layer comprises ablation lines,
   wherein the ablation lines of the electrically conductive layer close in on themselves while forming non-conductive strips, each of the non-conductive strips occupying a major portion of a distance between the first and second busbars, a shape of the non-conductive strips being capable of providing a temperature of heating by the electrically conductive layer that is virtually constant over the entire area of the zone, and
   wherein none of the one or more ablation lines that form at least one of the non-conductive strips extend to the first or the second busbar such that said at least one of the non-conductive strips is surrounded on all sides by a conductive region of the electrically conductive layer.

* * * * *